United States Patent
Caruel

(10) Patent No.: US 10,669,971 B2
(45) Date of Patent: Jun. 2, 2020

(54) THRUST REVERSER FOR A TURBOJET ENGINE NACELLE, COMPRISING CASCADES PARTIALLY INTEGRATED IN THE COWLS

(71) Applicant: AIRCELLE, Gonfreville l'Orcher (FR)

(72) Inventor: Pierre Caruel, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 818 days.

(21) Appl. No.: 14/978,490

(22) Filed: Dec. 22, 2015

(65) Prior Publication Data

US 2016/0108852 A1   Apr. 21, 2016

Related U.S. Application Data

(63) Continuation of application No. PCT/FR2014/051688, filed on Jul. 1, 2014.

(30) Foreign Application Priority Data

Jul. 1, 2013  (FR) ..................................... 13 56375

(51) Int. Cl.
*F02K 1/72* (2006.01)
*F16H 25/22* (2006.01)
*F16H 25/20* (2006.01)

(52) U.S. Cl.
CPC ........... *F02K 1/72* (2013.01); *F16H 25/2204* (2013.01); *F16H 2025/2093* (2013.01); *Y02T 50/671* (2013.01)

(58) Field of Classification Search
CPC ..... F02K 1/64; F02K 1/68; F02K 1/70; F02K 1/72; F02K 1/76; F02K 1/763;
(Continued)

(56) References Cited

U.S. PATENT DOCUMENTS

| | | | | |
|---|---|---|---|---|
| 3,500,645 A | * | 3/1970 | Hom | .......................... F02K 1/72 |
| | | | | 239/265.29 |
| 4,005,822 A | * | 2/1977 | Timms | .................. B64C 25/423 |
| | | | | 239/265.31 |

(Continued)

FOREIGN PATENT DOCUMENTS

| | | |
|---|---|---|
| EP | 2 551 506 A2 | 1/2013 |
| WO | 2011/135238 A1 | 11/2011 |
| WO | 2012/010774 A2 | 1/2012 |

OTHER PUBLICATIONS

English Machine Translation of WO 2012010774 A2, provided by Espacenet, Translation begins at p. 18 of 40.*

(Continued)

*Primary Examiner* — Jason H Duger

(74) *Attorney, Agent, or Firm* — Burris Law, PLLC

(57) ABSTRACT

A thrust reverser for a turbojet engine nacelle includes movable cowls which move backward relative to a front frame under the action of an actuation system, thereby making flaps tilt, via a control mechanism, so as to substantially close the annular cold air flow path, and by opening cascades disposed around this flow path and which receive the cold air flow and return it forward. When the thrust reverser is closed, the cascades are partially integrated in the cowls, and the thrust reverser includes an actuation system which makes the cascades move backward along a stroke which is shorter than the stroke of the cowl.

13 Claims, 2 Drawing Sheets

(58) Field of Classification Search
CPC ... F02K 1/766; B64D 33/04; F05D 2240/129; F16H 25/2204; F16H 2025/2093
See application file for complete search history.

(56) References Cited

U.S. PATENT DOCUMENTS

| | | | | |
|---|---|---|---|---|
| 4,909,442 | A * | 3/1990 | Fernz | F02K 1/72 |
| | | | | 239/265.29 |
| 5,228,641 | A | 7/1993 | Remlaoui | |
| 6,256,980 | B1 * | 7/2001 | Lecordix | F02K 1/72 |
| | | | | 239/265.29 |
| 6,434,927 | B1 * | 8/2002 | Stretton | F02K 1/72 |
| | | | | 239/265.31 |
| 6,598,386 | B2 * | 7/2003 | Johnson | B64D 33/04 |
| | | | | 239/265.29 |
| 8,793,973 | B2 * | 8/2014 | Vauchel | F02K 1/72 |
| | | | | 239/265.19 |
| 9,115,668 | B2 * | 8/2015 | Vauchel | F02K 1/763 |
| 9,856,825 | B2 * | 1/2018 | Gallet | F02K 1/70 |
| 2012/0067975 | A1 * | 3/2012 | Vauchel | F02K 1/72 |
| | | | | 239/265.33 |

OTHER PUBLICATIONS

International Search Report dated Jan. 23, 2015 in International Application No. PCT/FR2014/051688.

\* cited by examiner

THRUST REVERSER FOR A TURBOJET ENGINE NACELLE, COMPRISING CASCADES PARTIALLY INTEGRATED IN THE COWLS

CROSS-REFERENCE TO RELATED APPLICATIONS

This application is a continuation of International Application No. PCT/FR2014/051688, filed on Jul. 1, 2014, which claims the benefit of FR 13/56375, filed on Jul. 1, 2013. The disclosures of the above applications are incorporated herein by reference.

FIELD

The present disclosure relates to a thrust reverser for an aircraft nacelle intended to receive a turbojet engine.

BACKGROUND

The statements in this section merely provide background information related to the present disclosure and may not constitute prior art.

The motorization assembly for aircrafts includes a nacelle forming an external envelope which is generally circular and which comprises, inside, a turbojet engine disposed along the longitudinal axis of this nacelle.

The turbojet engine receives fresh air coming from the upstream or front side, and discharges at the downstream or rear side the hot gases which result from the combustion of fuel and which deliver a certain thrust. In bypass turbojet engines, fan blades which are disposed around this turbojet engine generate a significant secondary cold air flow which is conveyed along an annular flow path extending between the engine and the nacelle, thereby adding a high thrust.

Some nacelles include a thrust reversal system which closes, at least in part, the annular cold air flow path, and which discharges the secondary flow forward in order to generate a backward thrust for breaking the aircraft.

A known type of thrust reversers, presented in particular in Document U.S. Pat. No. 5,228,641, includes cascades which are fastened to the front frame and which are integrated in the thickness of the movable cowls when the thrust reverser is closed. The flaps, which are disposed below the cascades, include a front end which is connected to the movable cowl via a hinge, and a rear end which is connected via a connecting rod which extends rearward toward a connecting arm and which returns forward in order to be fastened on the front frame.

The backward motion of the movable cowls makes the connecting rods and their flaps tilt by descending in the annular flow path in order to close it.

This type of thrust reversers comprising the cascades and the flaps with their control systems, integrated in the movable cowls when the thrust reverser is closed, pose congestion issues. In some cases, the dimensions of the cascades are limited in order to enable their insertion in these cowls, or a larger thickness of the cowls is provided. The aerodynamic performance of the cascades and the profile of the cowls are thus not optimized.

SUMMARY

The present disclosure proposes a thrust reverser for a turbojet engine nacelle, comprising movable cowls which move backward relative to a front frame under the action of an actuation system, by making flaps tilt, via a control mechanism, so as to substantially close the annular cold air flow path, and by opening cascades disposed around this flow path and which receive the cold air flow and return it forward, characterized in that, the thrust reverser being closed, the cascades are partially integrated in the cowls, and in that it includes an actuation system which makes the cascades move backward along a stroke which is shorter than the stroke of the cowl.

Since the cascades are integrated in the movable cowls only in part, a reduced radial thickness of the cowls is sufficient for receiving, inside, this portion of the cascades as well as the flaps which comprise their control mechanisms.

In addition, by connecting the control mechanism both to the cowls and to the cascades, it is possible to use the relative motion between these two elements in order to actuate the flaps, thereby allowing for a better integration of this mechanism in the cowl while avoiding having any element which passes through the cold air flow in order to bear on the fixed internal structure.

In addition, the thrust reverser according to the present disclosure may include one or several of the following features, which may be combined together.

Advantageously, each flap is connected to the cascades via a guiding pin.

Advantageously, each flap is connected to a cowl via a connecting rod comprising hinges at its ends. In this manner, a tilt-up control mechanism is obtained which mechanism is simple and effective.

In particular, the cascade which lies above a flap, may include a tab directed radially inward, and which protrudes into the annular flow path, terminated by the guiding pin, the front hinge of the connecting rod being disposed radially outwardly of this guiding pin when the thrust reverser is closed.

Advantageously, the rear hinge of the connecting rod is fastened on a support which may be separated from the cowl by a radial movement outwardly of this cowl. Thus, it is possible to open the cowl, in a simple and rapid manner, without the need for detaching it from the control mechanism.

In particular, the support is connected to the cowl via a positioning stud which is disposed radially and which nests in a corresponding recess.

Alternatively, the connection between the support and the cowl may include a gliders system sliding radially, and which permanently holds these two elements in contact during the opening of the cowl.

Advantageously, the front frame includes sealing gaskets above and below the passage of the cascades, directed rearward and which bear against corresponding flat faces which are fastened to these cascades when the thrust reverser is closed. Thus, by limiting the flow leakages at this junction, the efficiency in the direct jet mode is improved.

Advantageously, the actuation system performs two different strokes of the cowl and the cascades, which strokes are proportional to each other. In this manner, the stroke of the cascade is shorter than the stroke of the cowl.

Advantageously, the actuation system includes two mechanical ball-screw cylinders, which perform two different strokes when driven by the same motorization. Thus, it is possible to use one single motorization in order to achieve these two different strokes.

The actuation system may include a drive shaft which drives two pairs of bevel pinions, each of which rotates a screw of the two cylinders disposed parallel to each other.

This arrangement allows having two cylinders with a similar construction but including different strokes.

Alternatively, the actuation system may include two concentric mechanical cylinders, comprising the same screw which is provided with an external thread and an internal thread formed in a bore, for actuating each cylinder. This arrangement allows having a set of two cylinders which is quite compact.

Advantageously, the thrust reverser includes a motorization which drives, via a flexible shaft, several actuation systems distributed along the circumference of the nacelle. Thus, with one single motorization, synchronization is improved between the different cylinders distributed around the nacelle, thereby making the solution economical.

The present disclosure also relates to a nacelle for a turbojet engine provided with a thrust reverser according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
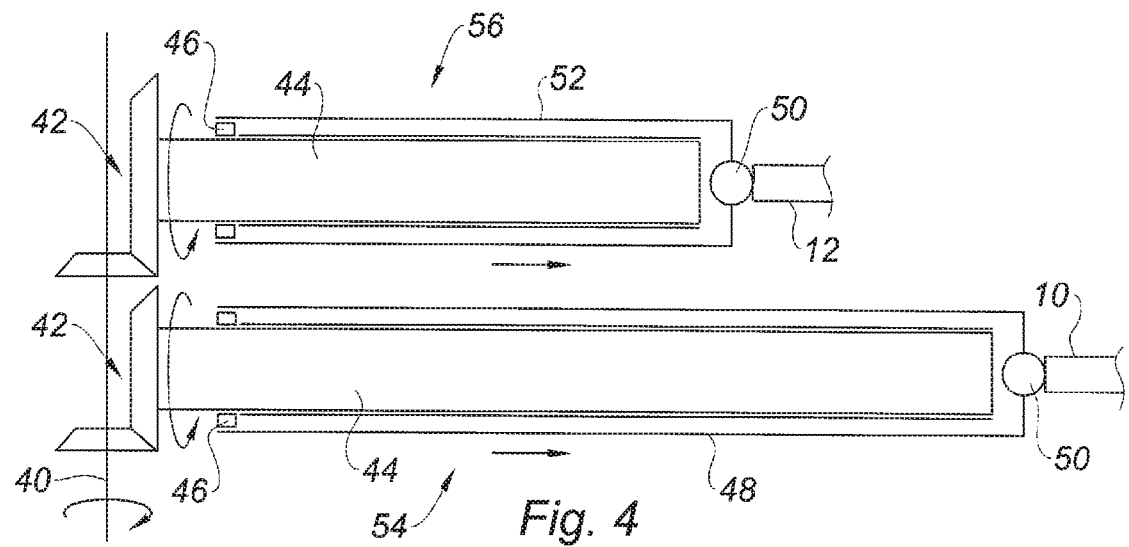
Figure 5:
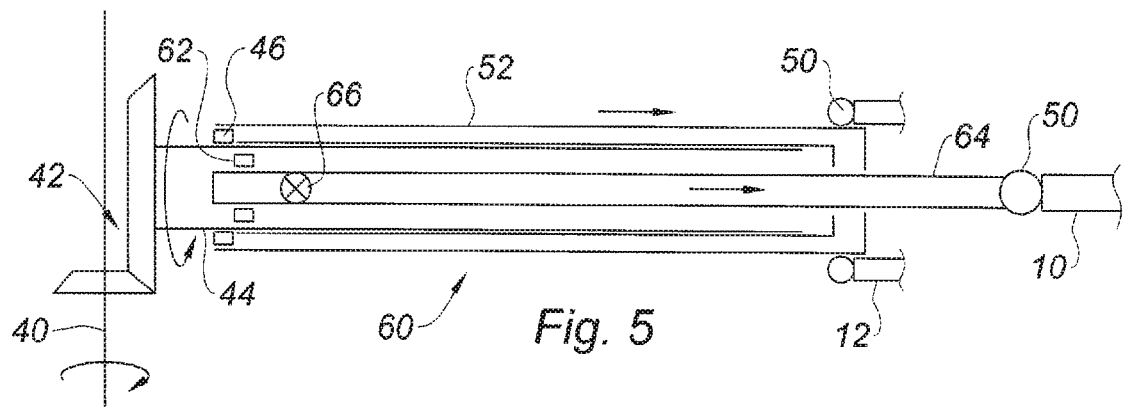

FIG. 4 presents a first type of an actuation system for this thrust reverser; and FIG. 5 presents a second type of an actuation system for this thrust reverser.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
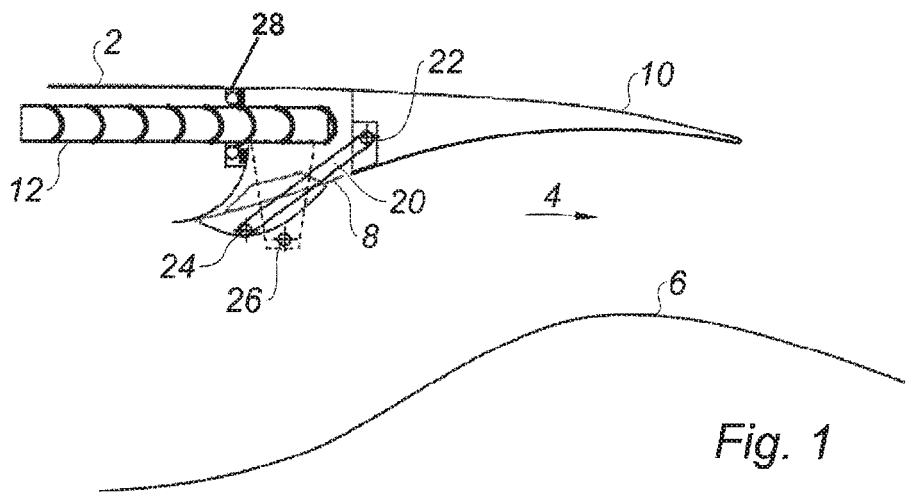
FIG. 1 is an axial half-sectional schematic of a thrust reverser according to the present disclosure, which is in the closed position.

FIG. 1 presents the rear portion of a nacelle for a turbojet engine, comprising a front frame 2 fastened on the structure located upstream of this portion, and movable cowls 10 which are adjusted to the rear of this frame.

The rear portion of the nacelle is covered by two movable cowls 10, each forming a half-circle, when viewed in a cross-sectional plane. Each cowl 10 is guided axially by longitudinal guide means, which means allow achieving a rearward sliding under the action of actuators, which actuators are not represented, and bearing on the fixed structure which is connected to the front frame 2. The cowls 10 include a system for locking them in the closed position, which system is not represented.

Alternatively, the nacelle may include one single movable cowl 10, forming a ring, when viewed in a cross-sectional plane, which slides backward in the same manner so as to open the thrust reverser.

The secondary annular flow path 4 includes a radially outer contour comprising flaps 8 which are adjusted on the inner surface of the movable cowls 10, so as to achieve aerodynamic continuity, and a radially inner contour formed by the fixed internal structure 6.

Cascades 12, laying around the annular flow path 4, form a crown comprising, when the thrust reverser is closed, an upstream portion which is larger and integrated in the front frame 2, and a downstream portion which is smaller and integrated in a room located in the front portion of the cowls 10. The cascades can slide backward through openings of the front frame 2.

Figure 2:
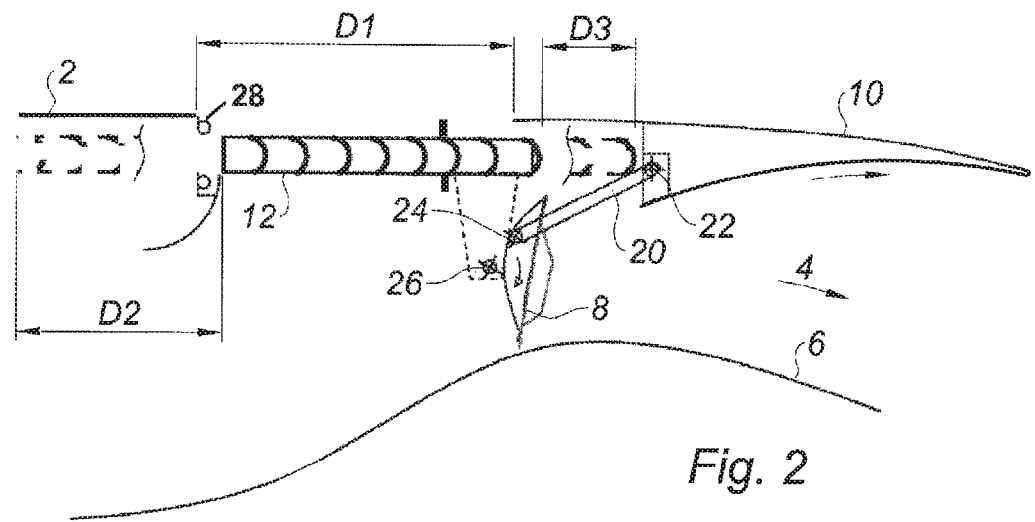
FIG. 2 is an axial half-sectional schematic of this thrust reverser, which is in the reversal position.

As presented in FIG. 2, the actuators of the thrust reverser, which may be hydraulic, electric or pneumatic, simultaneously perform a large stroke D1 for moving the cowls 10 backward so as to fully open them, and a shorter stroke D2 for moving the cascades 12 backward so as to fully deploying them out from the front frame 2. Thus, a relative stroke D3 is achieved during which the cascade 12 moves backward relative to the cowl 10, which relative stroke is equal to the difference between the strokes D1 and D2.

The cascade 12, which lies above a flap 8, includes a tab directed radially inward, and which protrudes into the annular flow path 4, terminated by a pin 26 intended to guide this flap so as to allow it to tilt from the rear.

For each flap 8, the tilt-up mechanism includes a connecting rod 20 comprising, at the back, a hinge 22 which is fastened inside the cowl 10 just to the rear of the room that is intended to receive the cascades 12, and at the front, a hinge 24 which is fastened to this flap at one point located to the front slightly above the guiding pin 26, the thrust reverser being closed.

In this manner, when the cowl 10 moves backward, the relative stroke D3 between this cowl and the cascade 12 results in pulling the connecting rod 20 on the flap 8 via its front hinge 24, thereby making this flap tilt about its guiding pin 26. At the end of the stroke of the cowl 10, the relative stroke D3 would have disposed the flaps 8 substantially vertically in order to close most of the annular flow path 4, these flaps deflect the air flow radially outward through the cascades 12 which direct this flow forward.

Thus is obtained a mechanism which is reliable, economical and devoid of any means that passes entirely through the annular flow path 4, and which slightly protrudes into this flow path, which mechanism integrates well in the cowl 10 and makes the flaps 8 tilt in a simple manner.

The front frame 2 includes, both above and below the passage of the cascades 12, an O-ring sealing gasket 28 directed rearward and surrounding the nacelle, which gasket bears on two corresponding flat faces which are fastened above and below these cascades, when the thrust reverser is closed.

Figure 3:
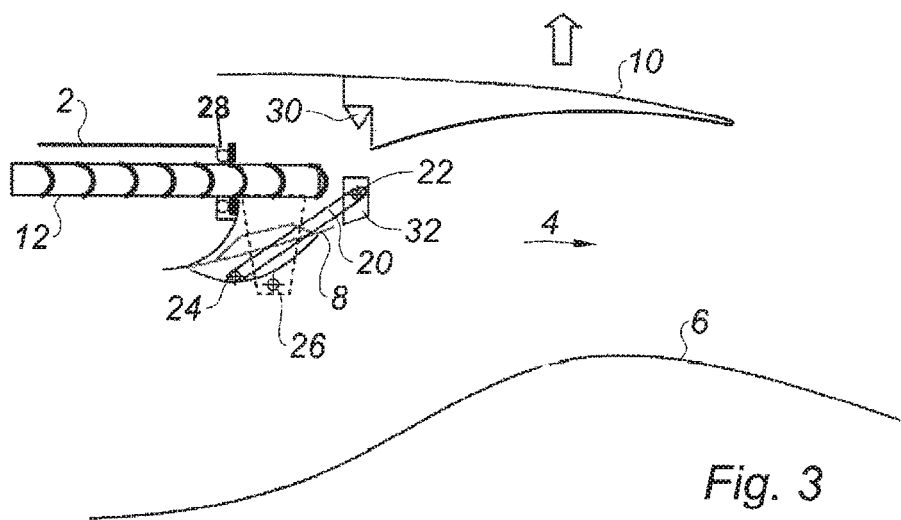
FIG. 3 is an axial half-sectional schematic of this thrust reverser, which presents a lateral opening at the cowl intended for maintenance operations.

FIG. 3 presents the rear hinge 22 of the connecting rod 20 connected to a support 32 and comprising a recess which receives a positioning stud 30 which is fastened to the cowl 10 and directed radially inward, this stud being capable of sliding relative to this support only but along the radial direction. In this manner, the support 32, which is connected to the actuation system, drives the cowl 10 via its stud 30 when moving backward for opening the thrust reverser, but, it disengages from the cowl when this cowl is open by pivoting radially outward, in order to enable maintenance operations in the nacelle.

Thus, a connection is achieved, in a simple manner, between the cowls 10, which may be open, on the one hand, and the actuation mechanisms of the flaps 8, which remain in position during the opening of the cowls, on the other hand.

Alternatively, the connection between the support 32 and the cowl 10 may include a gliders system sliding radially, and which maintains holding these two elements in contact during the opening of the cowl.

FIG. 4 presents an actuation system which allows synchronized displacement of the support 32, which is connected, on the one hand, to the cowls 10 by means of a first cylinder 54, and on the other hand, to the cascades 12 by means of a second cylinder 56, the actuation system comprising a drive shaft 40 which is driven by a motorization which may be electric, hydraulic or pneumatic.

As regards the first cylinder 54, the drive shaft 40 drives, via a first pair of bevel pinions 42, a screw 44 which receives, on its external thread, a nut 46 connected to a long sleeve 48 surrounding this screw, which is rotationally locked. The rotation of the screw 44 results in an axial displacement of the nut 46 and the long sleeve 48 which includes at its end, opposite to the pair of pinions 42, a connection 50 connected to the cowls 10.

In the same manner, as regards the second cylinder 56, the drive shaft 40 also drives, via a second pair of bevel pinions 42, a screw 44 comprising, on its external thread, a nut 46 connected to a short sleeve 52 surrounding this screw, which is rotationally locked. This short sleeve 52 includes at its end, opposite to the pair of pinions 42, a connection 50 connected to the cascades 12.

Advantageously, the connections 50 include degrees of freedom, in order not to result in a hyperstatic mounting which would induce high mechanical stresses in the components.

Advantageously, the ball-screw systems include, inside each nut 46, elements, such as balls or cylinders, which roll on the thread of the screw 44, in order to achieve a connection which is tight, with little friction and which allows for a high efficiency.

Thus, this ball-screw system allows realizing mechanical cylinders 54, 56 which are simple and effective, and which convert the rotational motion of the same motorization into two translational motions consisting of strokes which are different but proportional.

In order to perform the different strokes of the two cylinders, it is possible to dispose a pair of bevel pinions 42 on the second cylinder 56 with a reduction factor which is higher than the first cylinder 54, in order to make its screw 44 rotate more slowly. It is also possible to use a screw 44 including a reduced pitch, resulting in an axial displacement of the nut 46 which is lower for the same rotation of this screw.

In particular, it is possible to have one single motorization connected to a flexible shaft 40, which drives different actuation system distributed along the circumference of the nacelle, in order to make the set of cowls 10 and cascades 12 slide in a more synchronized manner.

FIG. 5 presents a double cylinder 60 comprising two concentric cylinders, provided with the same screw 44 which is driven by one single pair of bevel pinions 42 which are driven by a shaft 40.

The screw 44 includes an external thread which receives an external nut 46 fastened to the short external sleeve 52, and which is provided with a connection 50 connected to the cascades 12.

The screw 44 is hollow and it includes an internal thread which receives an internal screw 62 fastened to a long rod 64, and which is provided, at its end opposite to the pair of pinions 42, with a connection 50 connected to the cowls 10. Both the short external sleeve 52 and the long rod 64 are rotationally locked.

In the same manner, while being rotated by the same hollow screw 44, the stroke of the short sleeve 52 is shorter than the stroke of the long rod 64, thanks to two different pitches on the internal and external threads of this screw.

Complementarily, the rod 64 may include, on its portion which is integrated in the screw 44, a coupling 66 which leaves room for a small degree of freedom in order to avoid a hyperstatic mounting of this rod which would generate significant stresses.

Thus, there is realized an actuation system which is quite compact and which may also result in a high efficiency thanks to nuts 46, 62 including rolling elements.

In a general manner, it is expected that the thrust reverser according to the present disclosure would result in a reduction in the mass of the nacelle in the range of 50 kg as well as a reduction in consumption in the range of 0.3%. The removal of connecting rods, which usually pass through the annular cold air flow path 4 for maneuvering the flaps 8, also results in a reduction in consumption in the range of 0.1%.

Moreover, the thrust reverser according to the present disclosure allows easily adopting one single cowl 10 provided with a closed annular contour, instead of two half-cowls, thereby allowing for a reduction in the mass of the nacelle in the range of 150 kg as well as a reduction in consumption in the range of 1%.

What is claimed is:

1. A thrust reverser for a turbojet engine nacelle, comprising:

an actuation system; and movable cowls configured to move backward relative to a front frame under an action of the actuation system, thereby making flaps tilt, via a control mechanism, so as to close an annular cold air flow path, and by opening cascades which are disposed around the annular cold air flow path and which receive an annular cold air flow to be returned forward, the cascades configured to be partially integrated in the movable cowls when the thrust reverser is closed, wherein the actuation system is configured to make the cascades move backward along a stroke which is shorter than a stroke of the movable cowls, and wherein each flap is connected to the cascades via a guiding pin and is connected to a corresponding one of the movable cowls via a connecting rod comprising hinges at ends thereof, wherein a rear one of the hinges of the connecting rod is fastened on a support, the support being separate from and movable relative to the corresponding one of the movable cowls in a radial direction, and wherein the support is removably connected to the corresponding one of the movable cowls via a positioning stud which is disposed radially and nests in a corresponding recess.

2. The thrust reverser according to claim 1, wherein the cascades lie above the flaps and include a tab directed radially inward, and wherein the cascades protrude into the annular cold air flow path and are terminated by the guiding pin, a front one of the hinges of the connecting rod being disposed radially outwardly relative to the guiding pin when the thrust reverser is closed.

3. The thrust reverser according to claim 1, wherein the front frame includes sealing gaskets above and below a passage of the cascades, directed rearward, and wherein the sealing gaskets bear against corresponding flat faces which are fastened to the cascades when the thrust reverser is closed.

4. The thrust reverser according to claim 1, wherein the actuation system performs the two different strokes of the movable cowls and the cascades, and the two strokes are proportional to each other.

5. The thrust reverser according to claim 4, wherein the actuation system includes two mechanical ball-screw cylinders, which perform the two different strokes when driven by a same motorization.

6. The thrust reverser according to claim 5, wherein the actuation system includes a drive shaft which drives two pairs of bevel pinions, each of which rotates a screw of the two mechanical ball-screw cylinders disposed parallel to each other.

7. The thrust reverser according to claim 4, wherein the actuation system includes two concentric mechanical cylinders, comprising a screw which is provided with an external thread and an internal thread formed in a bore, for actuating each of the two concentric mechanical cylinders.

8. The thrust reverser according to claim 1, further comprising:
   a flexible shaft; and
   a motorization configured to drive the actuation system via the flexible shaft.

9. The thrust reverser according to claim 8, further comprising a plurality of actuation systems distributed along a circumference of the turbojet engine nacelle, wherein the motorization is configured to drive, via the flexible shaft, the plurality of actuation systems.

10. The thrust reverser according to claim 1, wherein the ends of the connecting rod include an upstream end connected to a corresponding one of the flaps and a downstream end connected to the corresponding one of the movable cowls.

11. The thrust reverser according to claim 1, wherein a portion of the cascades is disposed downstream from a front end of the movable cowls when the thrust reverser is closed.

12. The thrust reverser according to claim 1, wherein a downstream portion of the cascades extend into an inside of the movable cowls when the thrust reverser is closed.

13. A nacelle for a turbojet engine provided with the thrust reverser according to claim 1.

* * * * *